(12) United States Patent
Shinohara

(10) Patent No.: US 7,144,125 B2
(45) Date of Patent: Dec. 5, 2006

(54) MIRROR APPARATUS FOR VEHICLE

(75) Inventor: Teruaki Shinohara, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 116 days.

(21) Appl. No.: 10/606,123

(22) Filed: Jun. 26, 2003

(65) Prior Publication Data

US 2004/0057139 A1    Mar. 25, 2004

(30) Foreign Application Priority Data

Jul. 15, 2002    (JP) .............................. 2002-205833

(51) Int. Cl.
*B60R 1/06*    (2006.01)
*G02B 7/182*    (2006.01)

(52) U.S. Cl. .................... 359/871; 248/475.1

(58) Field of Classification Search ................ 359/871, 359/872, 877, 841; 248/475.1, 476, 479
See application file for complete search history.

(56) References Cited

U.S. PATENT DOCUMENTS

| | | | |
|---|---|---|---|
| 4,998,812 A * | 3/1991 | Hou ............................ | 359/841 |
| 4,998,814 A | 3/1991 | Perry | |
| 5,096,283 A * | 3/1992 | Croteau ...................... | 359/865 |
| 5,610,772 A * | 3/1997 | Iizuka ......................... | 359/841 |
| 6,116,743 A * | 9/2000 | Hoek .......................... | 359/871 |
| 6,213,609 B1 | 4/2001 | Foote et al. | |
| 6,655,807 B1 * | 12/2003 | McPherson et al. ......... | 359/841 |

* cited by examiner

*Primary Examiner*—Mark A. Robinson
(74) *Attorney, Agent, or Firm*—Foley & Lardner LLP

(57) ABSTRACT

A mirror housing, a base, and a unit bracket are formed as separate components. As a result, the mirror housing and the base can be painted with different colors.

17 Claims, 9 Drawing Sheets

MIRROR APPARATUS FOR VEHICLE

This application claims priority from Japanese Patent Application 2002-205833, filed Jul. 15, 2002, which is incorporated herein by reference in their entirety.

BACKGROUND OF THE INVENTION

1) Field of the Invention

The present invention relates to a mirror apparatus with a mirror-housing, a base, and a unit bracket fixed to a body of a vehicle. In this specification and claims, top, bottom, left, right, front, and rear are used with the vehicle as the reference.

2) Description of the Related Art

The U.S. Pat. No. 4,998,814 discloses a mirror apparatus for the vehicle. The disclosed mirror apparatus has a shell housing (12, 112), a mounting flange portion (22, 120), a mirror mounting bracket (14, 11), and a mirror (20). The shell housing, the mounting flage portion, and the mirror mounting bracket are fixed to the door (D) of the vehicle.

A first example of the mirror apparatus is illustrated in FIGS. 1 to 4 and 6 of the above-mentioned patent. In this mirror apparatus, the shell housing and the mounting flange portion are integrated into one body. As a result, this mirror apparatus has following problems. Namely, a masking painting is required if the shell housing and the mounting flange portion have to be painted With different colors. In other words, the so called two-tone color painting is required to be performed. The masking painting is complicated it increases the production cost. In addition, a mold to form an integrated structure of the shell housing and the mounting flange portion becomes complicated, if a neck is to be formed between the shell housing and the mounting flange portion. As a result, the production steps become complicated and even the production cost increases.

Meanwhile, a second example of the mirror apparatus is illustrated in FIGS. 5 and 7 to 10 of the above-mentioned patent. In this mirror apparatus, the mounting flange portion and the mirror mounting bracket are integrated into one body, moreover the shell housing shrouds the mirror mounting bracket. However, because of such a structure, it is impossible to form a neck between the shell housing and the mounting flange portion.

The U.S. Pat. No. 6,213,609 also discloses a mirror apparatus for the vehicle. This mirror apparatus has a shell housing and a mounting flange portion that are constituted discretely with a neck therebetween. This mirror apparatus is rotatable relative to the vehicle body. Moreover, the shell housing, the mounting flange portion, and the mirror mounting bracket are not fixed to the vehicle body.

SUMMARY OF THE INVENTION

It is an object of the present invention to solve at least the problems in the conventional technology.

In a mirror apparatus according to one aspect of the present invention, a mirror housing, a base, and a unit bracket are constituted discretely. A first mounting portion of the unit bracket is mounted on the mirror housing, and a second mounting portion of the unit bracket is made to protrude from a lamp housing and is mounted to a second mounting portion of the base. The second mounting portion of the base and the second mounting portion of the unit bracket together form the neck between the mirror housing and the base.

Thus, it is possible to apply the mirror housing and the base different colors. Furthermore, it becomes possible to form the neck without using a complicated mold. This enables a cost cutting and increases freedom in the designing.

The other objects, features and advantages of the present invention are specifically set forth in or will become apparent from the following detailed descriptions of the invention when read in conjunction with the accompanying drawings.

DETAILED DESCRIPTION

Figure 1:
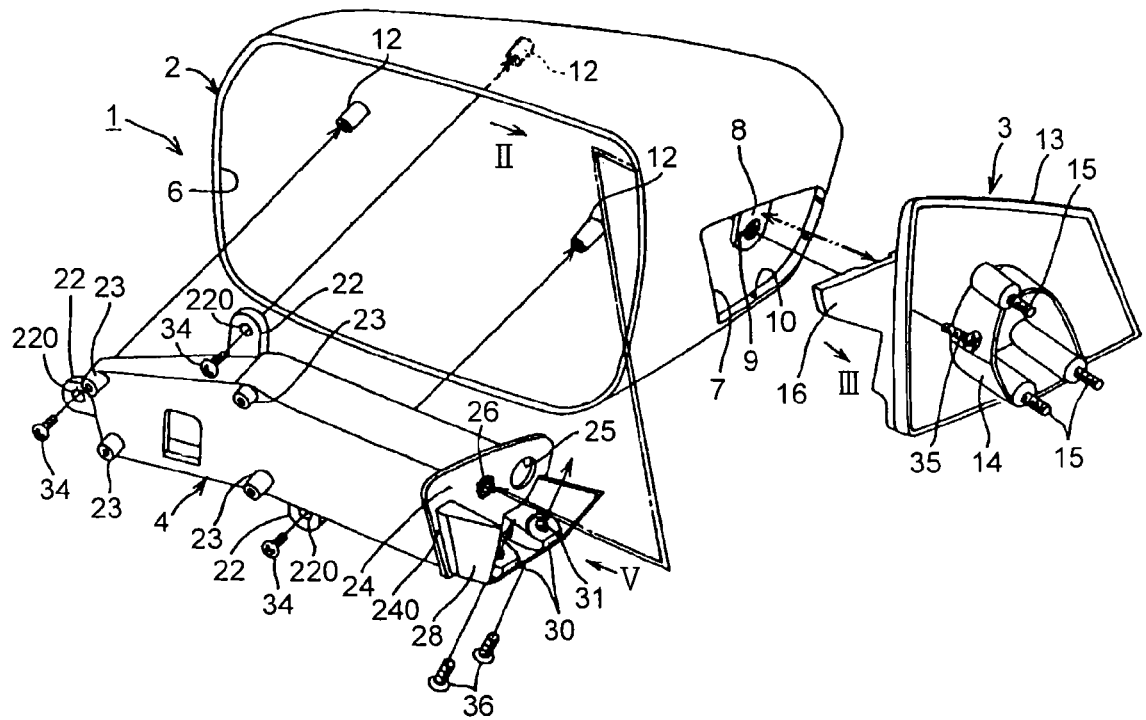
FIG. 1 is an exploded perspective view of a mirror apparatus according to a first embodiment of the present invention.

Exemplary embodiments of the mirror apparatus according to the present invention will be explained below with reference to the accompanying drawings. It is assumed here that the mirror apparatuses are fixed on an outer surface of the left and the right front doors of an automobile, however, the mirror apparatus may be fixed to only one door or the mirror apparatus may even be fixed to any place other than the door.

In the figures, reference numeral 1 indicates a mirror apparatus. This mirror apparatus 1 includes a mirror housing 2, a base 3, a unit bracket 4, a mirror unit 38, and a power unit 41. The mirror housing 2, the base 3, the unit bracket 4, the mirror unit 38, and the power unit 41 are separate parts.

The mirror housing 2 is like a hollow box and it is made of, for example, plastic. There is an opening 6 on a front side of the mirror housing 2 to arrange the mirror unit 38 (see FIG. 1). There is an opening 7 on a side that opposes to a not shown door of the vehicle (see FIGS. 1 and 2). The opening 6 is almost oblong-shaped while the opening 7 is almost trapezoid-shaped. A plate part 8 is formed on the mirror housing in a manner to protrude in the opening 7. An outer surface of the plate part 8 and an outer wall of the mirror housing 2 are almost at one level without any step. The plate part 8 has a round through-hole 9. A plurality of small ribs 10 are provided on the mirror housing in a manner to protrude in the opening 7. A loop-shaped mating flat surface 11 is provided on along the inner circumference of the opening 7. Three mounting bosses 12 are formed on an inner surface of the mirror housing 2.

An outer surface and a part of an inner surface of the mirror housing 2 are painted with a different color from a color of the base 3 and the unit bracket 4. The part of the inner surface pained with a different color is an area ranging from arrows P to an end of the mirror housing 2 (see FIGS. 16 and 17).

Figure 3:
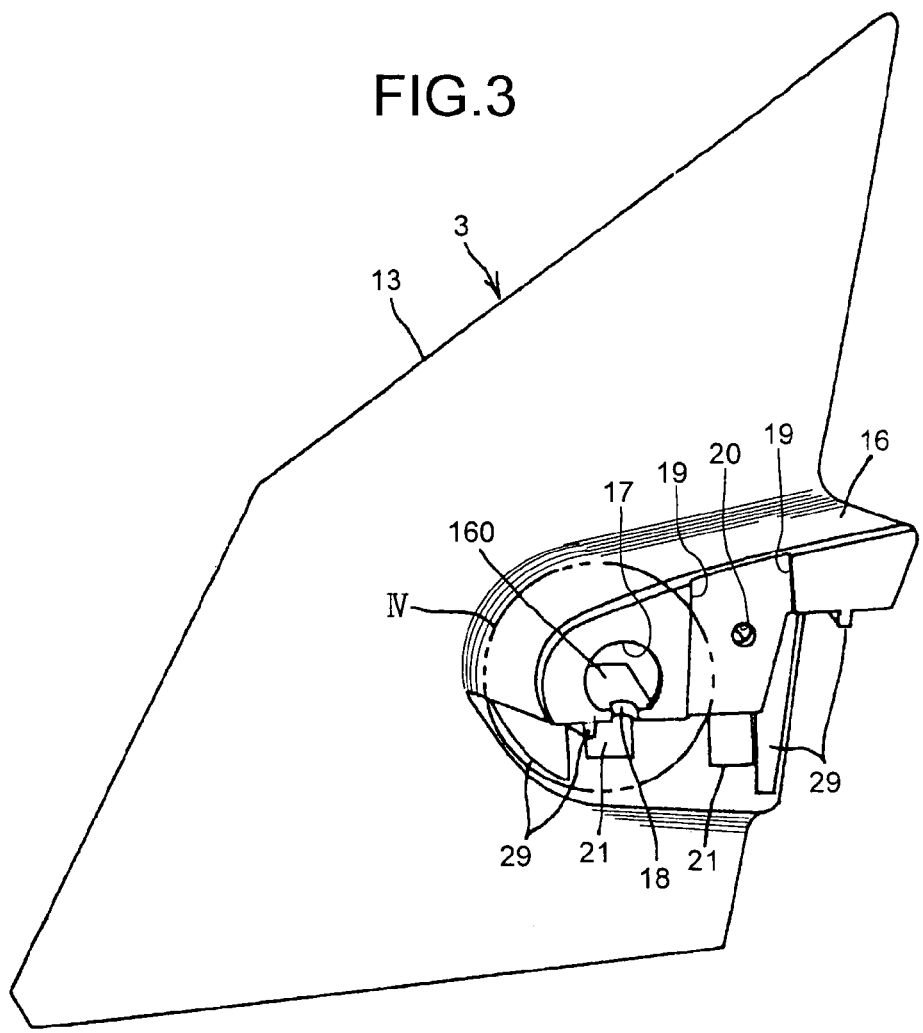
FIG. 3 is a perspective view of a base when viewed from the direction of an arrow III in FIG. 1.
Figure 4:
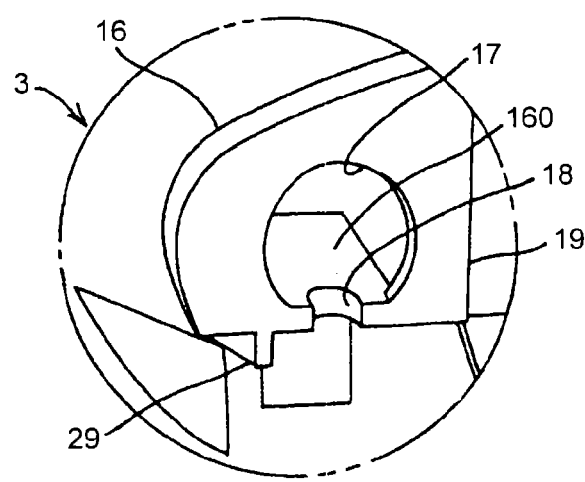
FIG. 4 is an enlarged perspective view of a part IV in FIG. 3.

The base 3 is made of, for example, plastic or a mixture of plastic and glass fiber. The base 3 has a plate-shaped base portion 13 (see FIGS. 1, 3, and 4). A wall 14 is provided on almost a center of one side, which faces towards the door of the vehicle, of the base portion 13. Three stud-bolts 15 are embedded in the wall 14. The base 3 is fixed to the door of the vehicle using these stud-bolts.

An upper neck portion 16 is provided on a side, which faces away from the door of the vehicle, of the base portion 13. The upper neck portion 16 is hollow. The upper neck portion 16 greatly tapers towards the end that is fit into the mirror housing 2. The end of the upper neck portion 16 is closed. The upper neck portion 16 is sized so as to be inserted into an upper portion of the opening 7 of the mirror housing 2. An almost circular through-hole 17 is provided in one side of the upper neck portion 16 (see FIG. 4) to insert a harness. The through-hole 17 opens in a space surrounded by the wall 14. A lower part of the through-hole 17 forms a chord with a bottom wall 160 of the upper neck portion 16. The bottom wall 160 has a notch 18.

Two almost parallel steps 19 are formed in a central part of the upper neck portion 16. The width between these steps 19 is almost equal to or little wider than a width of the plate part 8. The height of these steps 19 is almost equal to a thickness of a plate of the plate portion 8. The steps 19 and the plate portion 8 constitute a unit to prevent a backlash. A through-hole 20 is formed between the two steps 19 to pass a screw. The through-hole 20 is small and round-shaped and positioned in a direction that intersects the closed face of the base portion 13 (the upper neck portion 16) at almost right angles.

Figure 11:
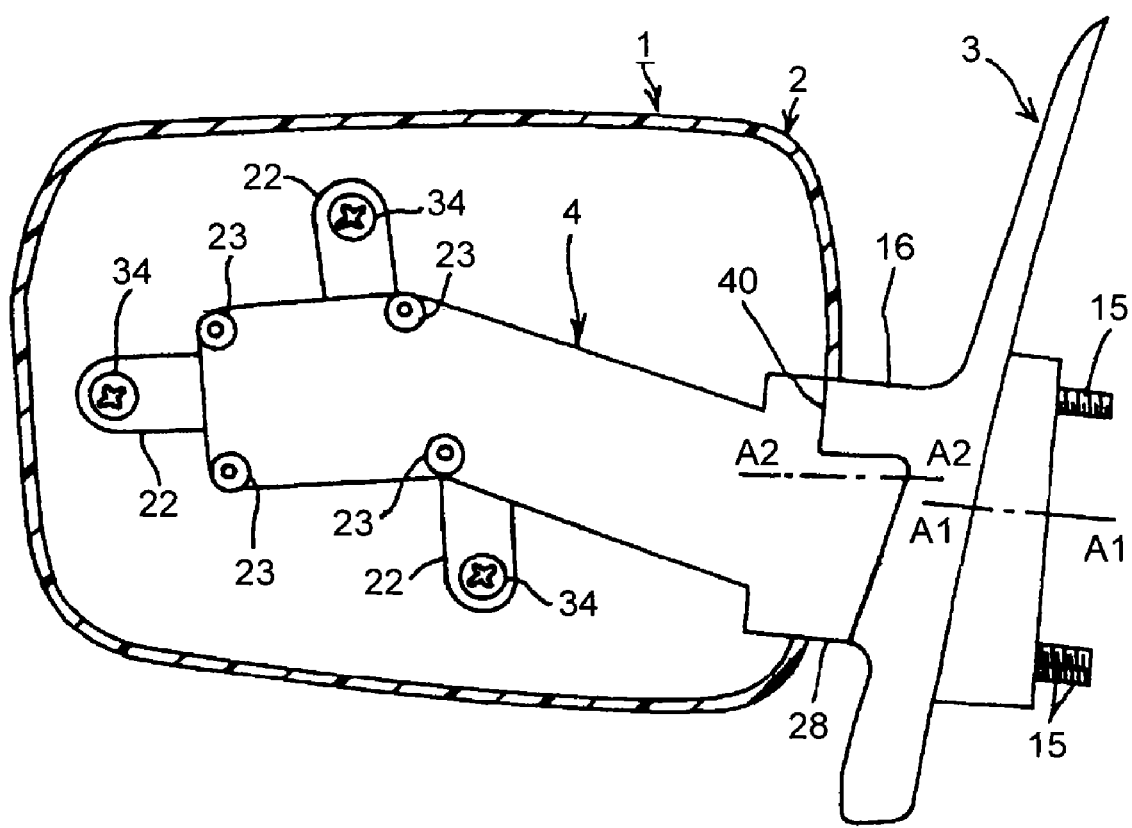
FIG. 11 is a cross section of the mirror apparatus taken along line XI—XI in FIG. 8.

Two mounting boss portions 21 are integrated into the lower part of the upper neck 16. The mounting boss portions 21 are positioned in a direction that intersects the through-hole 20 at almost right angles. The upper neck portion 16, the closed face having the small round through-hole 20, and the mounting boss portions 21 constitute a second mounting portion on which the unit bracket 4 is mounted. A mounting axis A1—A1 of the first mounting portion in the base 3 and a mounting axis A2—A2 of the second mounting portion in the base 3 are close to each other as shown in FIG. 11.

Figure 2:
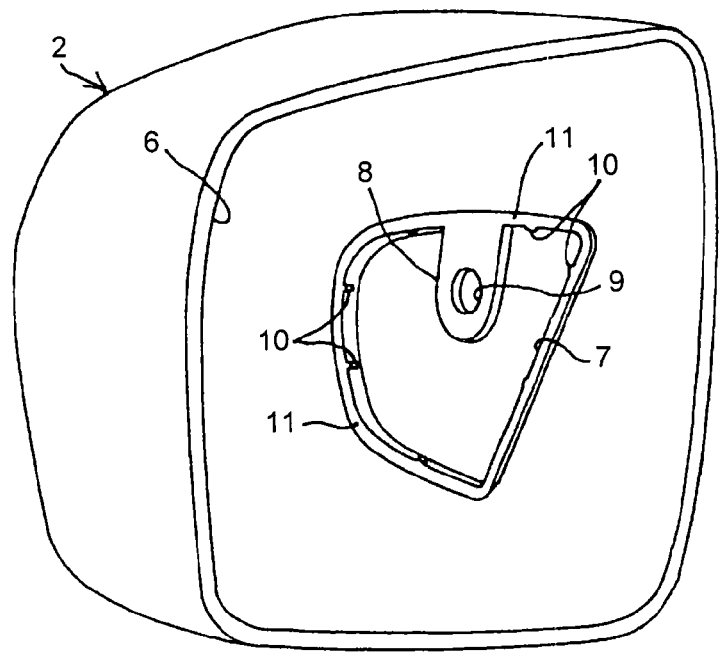
FIG. 2 is a perspective view of a mirror housing when viewed from the direction of an arrow II in FIG. 1.
Figure 5:
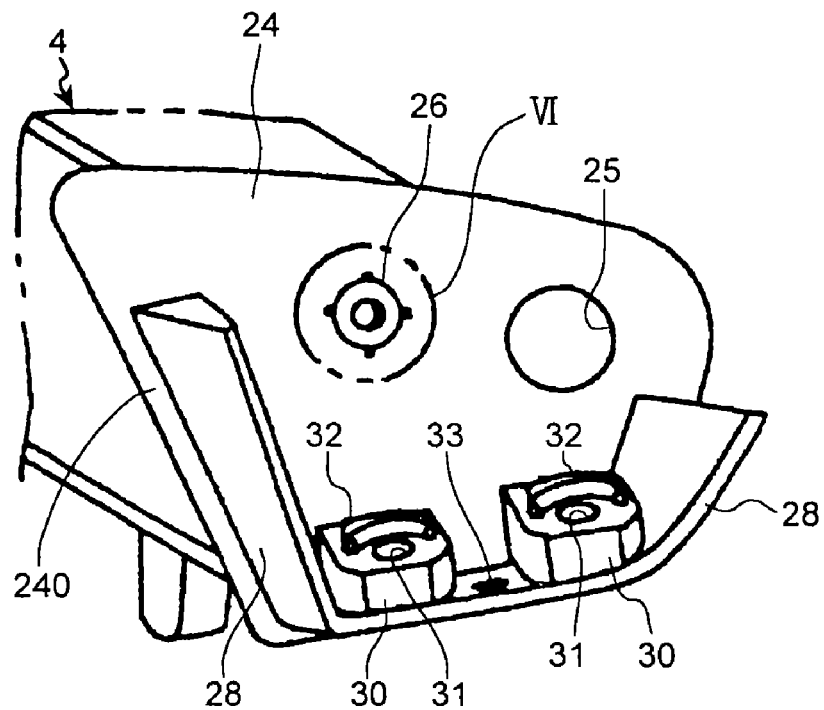
FIG. 5 is a perspective view of a unit bracket when viewed from the direction of an arrow V in FIG. 1.
Figure 6:
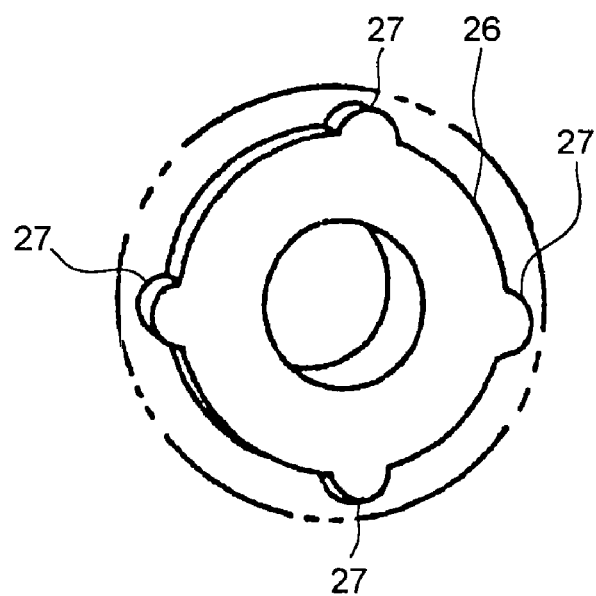
FIG. 6 is an enlarged perspective view of a part VI in FIG. 5.
Figure 7:
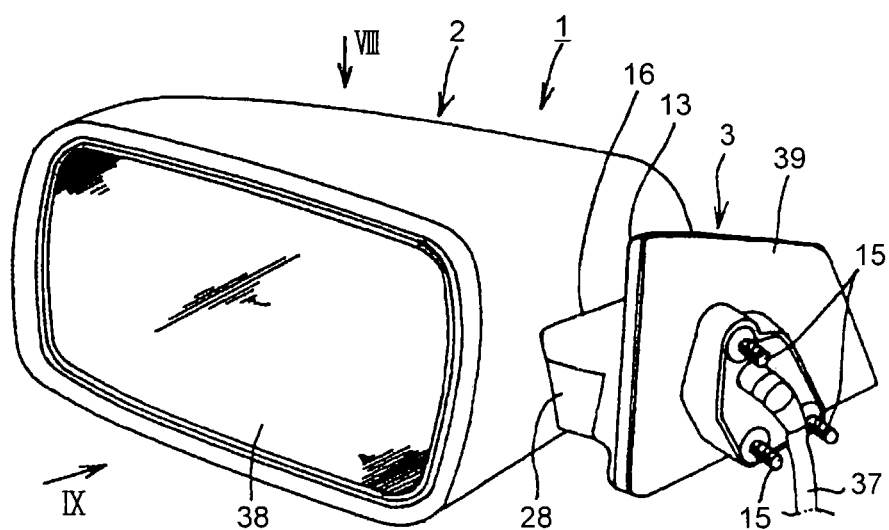
FIG. 7 is a perspective view of the mirror apparatus assembled.
Figure 8:
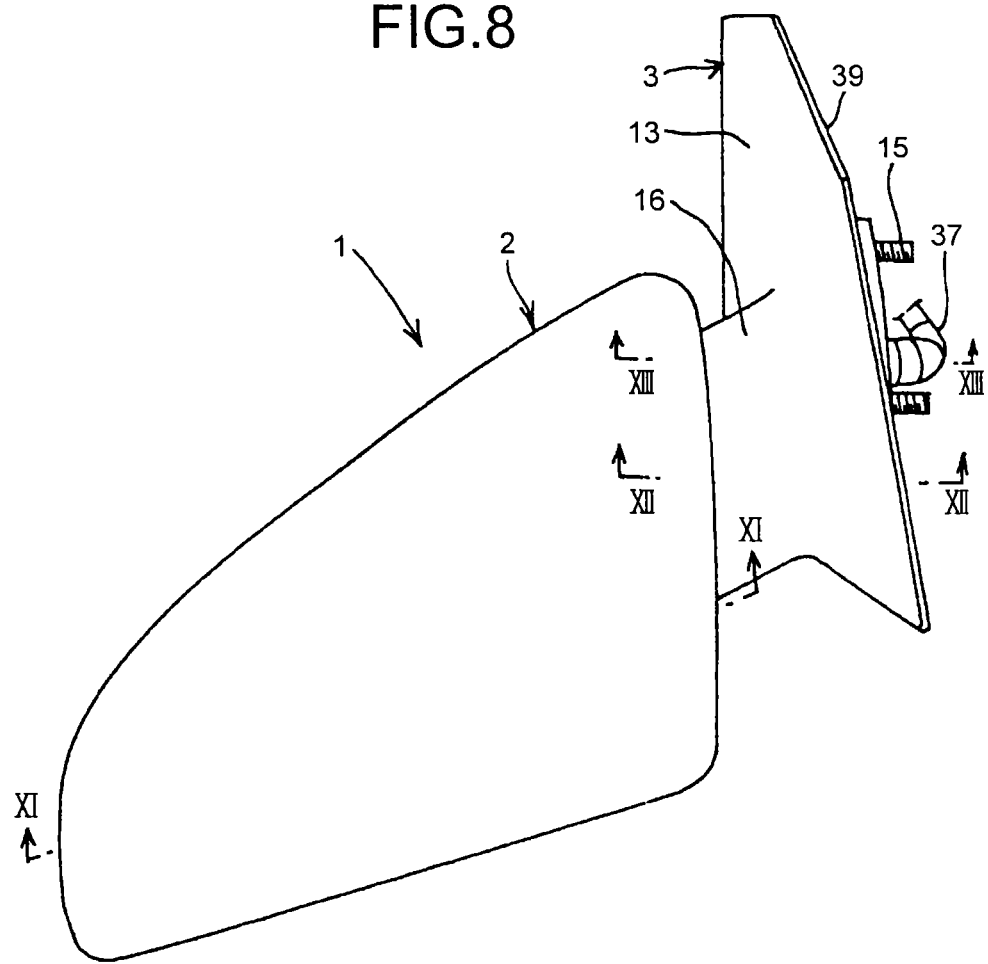
FIG. 8 is a perspective view of the mirror apparatus when viewed from the direction of an arrow VIII in FIG. 7.
Figure 9:
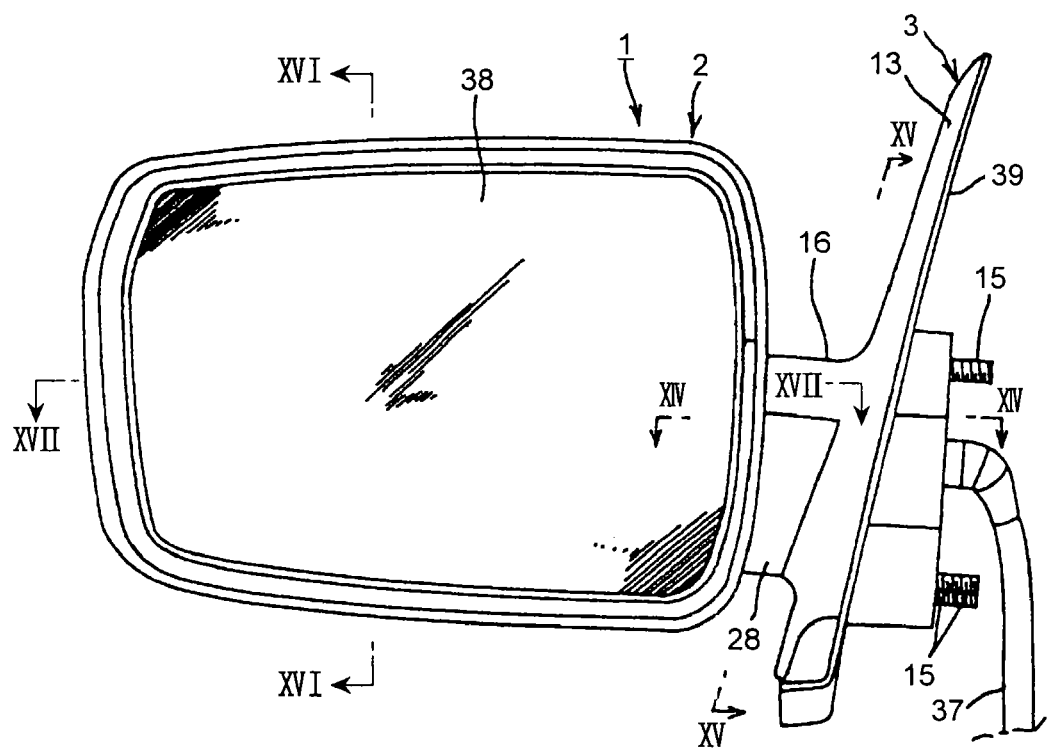
FIG. 9 is a perspective view of the mirror apparatus when viewed from the direction of an arrow IX in FIG. 7.

The unit bracket 4 has a configuration shown in FIGS. 1, 5, and 6 and is made of, for example, plastic or a mixture of plastic and glass fiber. The unit bracket 4 is nearly parallelepiped in shape. In addition, the unit bracket 4 is composed of thin plates and longitudinal and lateral ribs, to lower weight and increase rigidity. One end of the unit bracket 4 is integrally provided with the three mounting pieces 22 corresponding to the three mounting boss portions 12. Each of the three mounting pieces 22 is provided with a small round-shaped through hole 220 to pass through a screw. Other end of the unit bracket 4 is integrally provided with four mounting boss portions 23. The three mounting pieces 22 and the four mounting boss portions 23 are mounted on the mirror housing 2 and compose the first mounting portion to which the power unit is mounted.

Meanwhile, the other end of the unit bracket 4 is integrally provided with a flat plate portion 24. The flat plate portion 24 is almost orthogonal to the direction of the length of the unit bracket 4. Moreover, the flat plate portion 24 is large enough to blockade the opening 7 of the mirror housing 2. One of the ends of an upper part of the flat plate 24 is provided with a round through-hole 25 to let a harness pass through (hereinafter, "through-hole"). The through-hole 25 corresponds to the through-hole 17 of the base 3, and a diameter of the through-hole 25 is almost the same as the diameter of the through-hole 17.

Central area of the upper part of the flat plate 24 has a columnar mounting boss portion 26 that corresponds to the round through-hole 9 of the mirror housing 2 and the through-hole 20 of the base 3. Length of the boss portion 26 in axial direction is approximately same as the thickness of the plate part 8. Four even spaced small ribs 27 are integrated into outer circumference of the boss portion 26. The small ribs 27 of the boss portion 26 and inner circumference of the round through-hole 9 of the plate part 8 in the mirror housing 2 constitute the backlash prevention unit.

A lower neck portion 28 is integrated into a lower half of the flat plate 24. The lower neck portion 28 is a U-shaped wall that includes a bottom wall and two side walls. The lower neck portion 28 is a little larger than the flat plate 24. The circumference of the flat plate 24, which occupies an outer position than the lower neck portion 28, is provided with a mating flat surface 240. The lower neck portion 28 is sized so as to be inserted into a lower portion of the opening 7 of the mirror housing 2. A largely narrowed neck portion is formed in an area extending from the base portion 13 of the base 3 to the mirror housing 2 by combining the lower neck portion 28 and the upper neck portion 16.

The upper neck portion 16 and the lower neck portion 28 that compose the narrowed neck portion and the small ribs 10 of the mirror housing 2 constitute the backlash prevention unit. A three-directional positioning is implemented for the upper neck portion 16 and the lower neck portion 28. Namely, a positioning in a first direction (upper and lower direction) is implemented by a contact of a under face of the upper neck portion 16 with a top face of the lower neck portion 28. Meanwhile, a positioning in a second direction (left and right direction) is implemented by a contact of the closed face of the upper neck portion 16 with the flat plate portion 24, and also by a contact of an end face of the lower neck portion 28 with the base portion 13. Moreover, a positioning in a third direction (back and forth direction) is implemented by a contact of a positioning rib with the both walls of the lower neck portion 28, the positioning rib thereof is formed extending from the upper neck portion 16 to the base portion 13.

In the bottom wall of the lower neck portion 28, two mounting stage portions 30 are integrated into the lower neck portion 28 corresponding to two mounting bolt portions 21 of the base 3. Each of the two mounting stage portion 30 has a small round through-hole 31 for a screw to pass through. The mounting stage portions 30 and the mounting boss portion 26 protrude outward from the opening 7 and compose a second mounting portion which is mounted on the second mounting portion of the base 3. The second mounting portion of the bracket 4 is mounted on the second mounting portion of the base 3 in a manner of suspension. A small half circular arc-shaped rib portion 32 is integrated into each of the two mounting stage portion 30. The small rib portion 32 and the mounting portions 21 of the base constitute the backlash prevention unit. A drain 33 is provided in between the two mounting stage portions 30 on the bottom wall of the lower neck portion 28. The drain 33 and the notch 18 constitute a drain unit.

Figure 16:
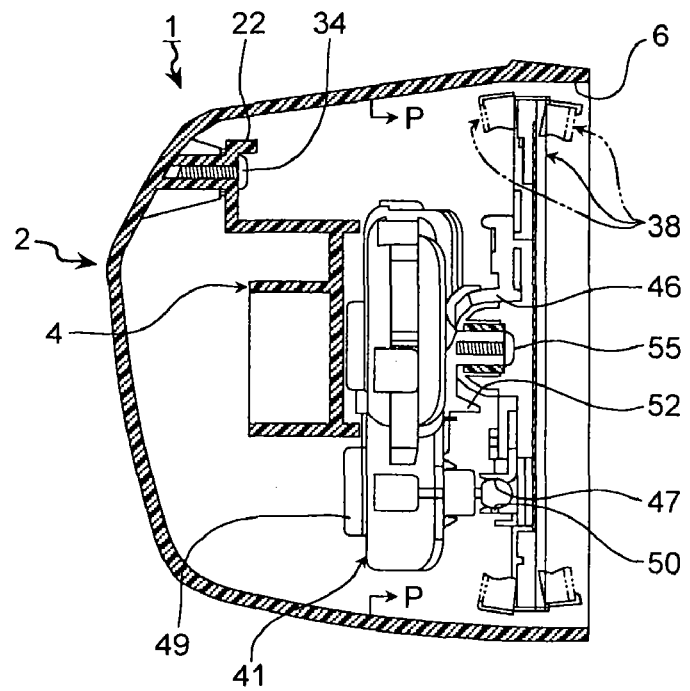
FIG. 16 is a cross section of the mirror apparatus taken along line XVI—XVI in FIG. 9.
Figure 17:
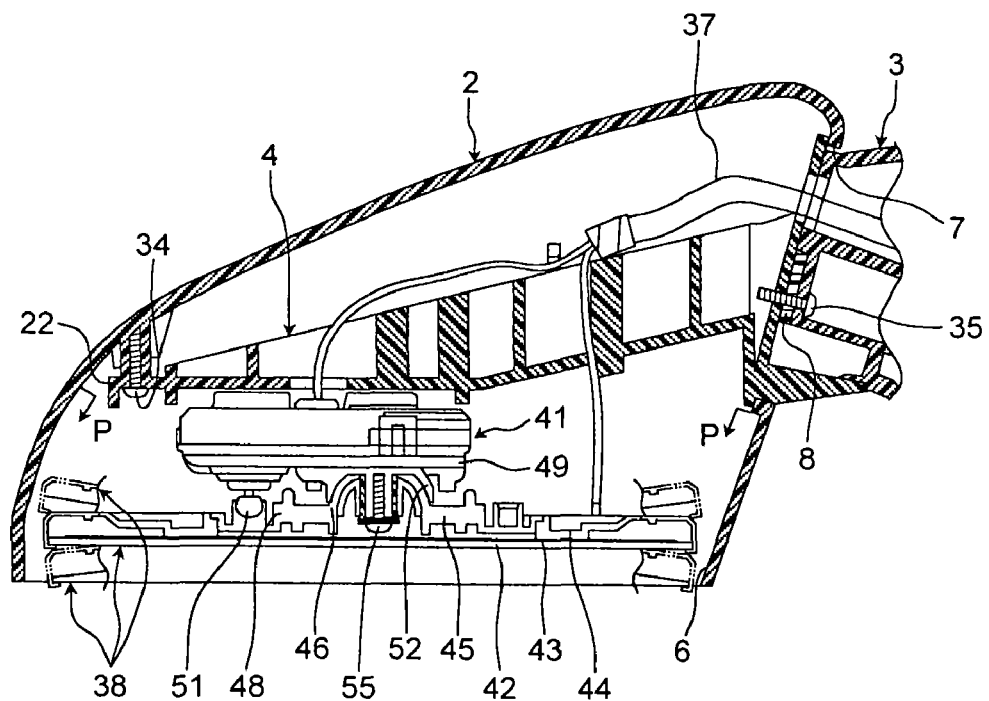
FIG. 17 is a cross section of the mirror apparatus taken along line XVII—XVII in FIG. 9.

The mirror unit 38 includes a mirror body (mirror glass) 42 having a mirror surface (i.e., a reflecting surface) as shown in FIG. 16 and FIG. 17. A heater 43 is arranged on the backside of the mirror body 42. Moreover a mirror holder 44 is fixed in a periphery of the mirror body 42. A central part of the mirror holder 44 is assembled into a mirror holder base 45. The mirror holder 44 and the mirror holder base 45 may be built in an integral structure. A central part of the mirror holder 45 is provided with a pivot bearing portion 46. Periphery of the mirror holder 45 is provided with a bearing portion 47 for a movement of the upper and lower direction and a bearing portion 48 for a movement of left and right direction.

Figure 10:
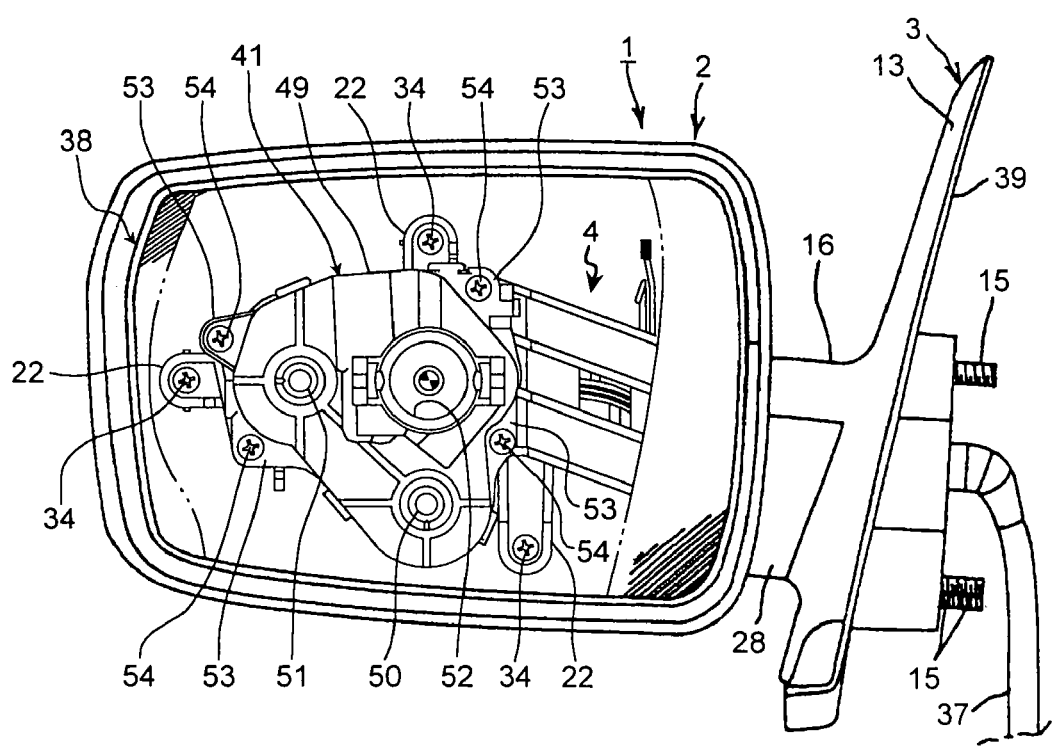
FIG. 10 is a front view of the mirror apparatus that is partly cutaway.

The power unit 41 has a casing 49 that is constituted by combining a pair of split cases as shown in FIGS. 10, 16, and 17. A not shown driving motor for rotating the mirror unit 38 in the upper and the lower directions and a not shown driving motor for rotating the mirror unit 38 towards left and right are housed in the casing 49. Moreover the casing 49 is provided with a rod 50 for realizing the rotation of the mirror unit 38 in the upper and the lower directions and a rod 51 for realizing the rotation of the mirror unit 38 towards left and right. The rod 50 and the rod 51 are connected to the corresponding driving motors through rotational power transmission systems. An end portion of the rod 50 and the end portion of the rod 51 are provided with ball portions corresponding to the bearing portion 47 and the bearing portion 48.

A central part of the casing 49 is provided with a pivot portion 52 in corresponding to the pivot bearing portion 46. Furthermore, the casing 49 has four mounting pieces 53 in a periphery of the casing 49, the mounting pieces 53 correspond to the four mounting boss portions 23 of the unit bracket 4. Each of the four mounting piece 53 has a small round through-hole which is not shown in the figures.

An example of how the mirror apparatus 1 can be assembled will be explained below.

To begin with, the unit bracket 4 is housed in the mirror housing unit, and the lower neck portion 28 in the second mounting portion of the unit bracket 4 is protruded outward from the opening 7 of the mirror housing 2 as an arrow of alternate long and short dashed lines indicate shown in FIG. 1. The mating flat surface 11 of the mirror housing 2 is made to come in contact with the mating flat surface 240 of the unit bracket 4 (refer to FIGS. 12 to 15). The mounting boss portion 26 of the unit bracket 4 is inserted into the round through-hole 9 of the mirror housing 2 (refer to FIGS. 12 and 14). In this state, the first mounting portion of the unit bracket 4 is mounted on the mirror housing 2. Namely, three screws 34 are screwed down to the mounting boss portions 12 of the mirror housing 2 through the small through-hole 220 in the mounting pieces 22 of the unit bracket 4 as solid line arrows indicate in FIG. 1 (refer to FIG. 11).

Subsequently, a tip of the upper neck portion 16 in the second mounting portion of the base 3 is inserted into the opening 7 of the mirror housing 2 as shown by a chain double-dashed line arrows in FIG. 1. Then, the plate portion 8 of the mirror housing 2 is fitted into between the two steps 19 (refer to FIG. 14). The upper neck portion 16 of the base 3 and the lower neck portion 28 of the unit bracket 4 are assembled together (refer to FIGS. 12 to 15). In this state, the second mounting portion of the base 3 and the second mounting portion of unit bracket 4 are mounted. In other words, a screw 35 is screwed down to the mounting boss portion 26 of the unit bracket 4 through the small round through-hole 20 of the base 3 as shown by an solid-line arrow in FIG. 1 (see also FIGS. 12 and 14). The two screws 36 are screwed down to the mounting boss portions 21 of the base 3 as shown by solid-line arrows in FIG. 1 (see also FIGS. 12 and 15).

Figure 13:
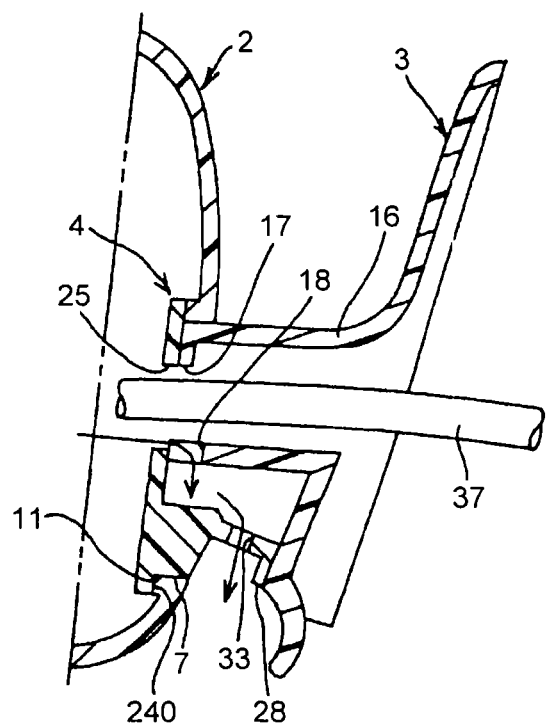
FIG. 13 is a cross section of the mirror apparatus taken along line XIII—XIII in FIG. 8.

Then, a harness 37 is housed in the mirror housing 2, after passing through the enclosing wall 14 and the through-hole 17 of the base 3, and the though-hole 25 of the unit bracket 4 (refer to FIGS. 13 and 17). The harness 37 is connected to the power unit 41. The power unit 41 is mounted on the first mounting portion of the unit bracket 4. That is to say, four screws 54 are screwed down to the mounting bosses 23 of the unit bracket through small round through-holes in the mounting pieces 53 of the power unit 41 (refer to FIG. 10). Then, the harness 37 is connected to the mirror unit 38. The mirror unit 38 is mounted on the power unit 41. Namely, the pivot bearing portion 46 on the mirror holder base 45 of the mirror unit 38 is fitted to the pivot portion 52 of the power unit 41.

A screw 55 is screwed down to the pivot portion 52 and pivot bearing portion 46 through a spherical washer, a spring, and a spring pressure plate. A spherical tip of the rod 50 and a spherical tip of the rod 51 are respectively press-fitted to the bearing portion 47 and to the bearing portion 48. The rod 50 and the rod 51 are included in the power unit 41, and the bearing portion 47 and the bearing portion 48 are included in the mirror holder base 45 of the mirror unit 38. The heater 43, into which are integrated the mirror body 42 and the mirror holder 44, is mounted on the mirror holder base 45. Thus, the mirror unit 38 is held by the power unit 41, and the mirror unit 38 is able to tilt up and down, and left and right. Then, a gasket 39 is set to a surface of the base portion 13 of the base 3.

This completes the assembly of the mirror apparatus 1. The mirror apparatus 1 is then attached to the door of the vehicle by setting a face of the base portion 13 of the base 3 to the door and screwing down not shown nuts to stud-bolts 15. It should be noted that the way the mirror apparatus 1 can be assembled is not limited to the above-explained method.

Advantages of the mirror apparatus 1 will now be explained. In the mirror apparatus 1 for the vehicle according to this embodiment, since the mirror housing 2, the base 3, and the unit bracket 4 are separate parts, it is possible to color the mirror housing 2, the base 3, and the unit bracket 4 with a different color respectively without using a technique of a masking painting. Moreover, in the second mounting portion (the lower neck portion 28) of the unit bracket that protrudes from the mirror housing 2, and also in the second mounting portion (the upper neck portion 16 of the base 3), it is possible to form the narrow neck portions (the upper neck portion 16 and the lower neck portion 28) in between the mirror housing 2 and the base 3 without using a complicated mold. Thus, the mirror apparatus 1 according to the present embodiment enables to reduce a production cost and increase a freedom of designing.

Furthermore, since the mounting axes A1—A1 and A2—A2 are near each other, the unit bracket 4 can be firmly attached to the door of the vehicle. As a result, vibrations of the mirror unit 38 can be suppressed.

Moreover, since the second mounting portion of the unit bracket 4 suspends from the second mounting portion of the base 3, the mirror housing 2 shrouds an upper part of seam 40, which is the seam between the base 3 and the unit bracket 4. As a result, the appearance of the mirror apparatus 1 is enhanced. Further, it is possible to miniaturize the second mounting portions of the base 3 and of the unit bracket 4, thus, it is possible to form considerably narrow neck portions 16 and 28 accordingly. Furthermore, it is possible to position the mounting axes A1—A1 and A2—A2 close to each other Moreover, the plate portion 8 is integrated into a part of the circumference of the opening 7 of the mirror housing 2, the plate portion 8 is sandwiched between the second mounting portion of the base 3 and the second mounting portion of the unit bracket 4 (refer to FIG. 12), and the mirror housing 2, the base 3, and the unit bracket 4 are fastened together by the screw 35. As a result, the mirror housing 2 is securely mounted to the base 3 and to the unit bracket 4. Namely, one of the end sides of the mirror housing 2 is mounted to the first mounting portion (mounting boss portion 23) of the bracket 4, another end sides of the mirror housing 2 is mounted between the second mounting portion of the base 3 and the second mounting portion of the unit bracket 4. Since the mirror housing 2 can be fixed firmly, it may be made lightweight. Moreover, the mirror housing 2, the base 3, and the unit bracket 4 are fastened together by only one screw 35, thus, since less number of screws are required, the production cost can be reduced.

The mirror apparatus 1 is provided with the backlash prevention units between the mirror housing 2 of the base 3, between the mirror housing 2 and the second mounting portion of the unit bracket 4, and between the second mounting portion of the base 3 and the second mounting portion of the unit bracket 4. As a result, even if there are small gaps between the components, a blackslash does not occur between the mirror housing 2, the base 3, and the unit bracket 4.

Figure 12:
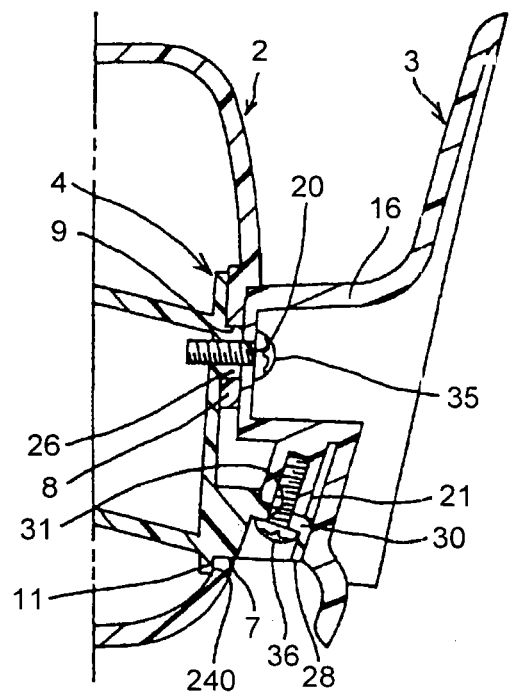
FIG. 12 is a cross section of the mirror apparatus taken along line XII—XII in FIG. 8.
Figure 14:
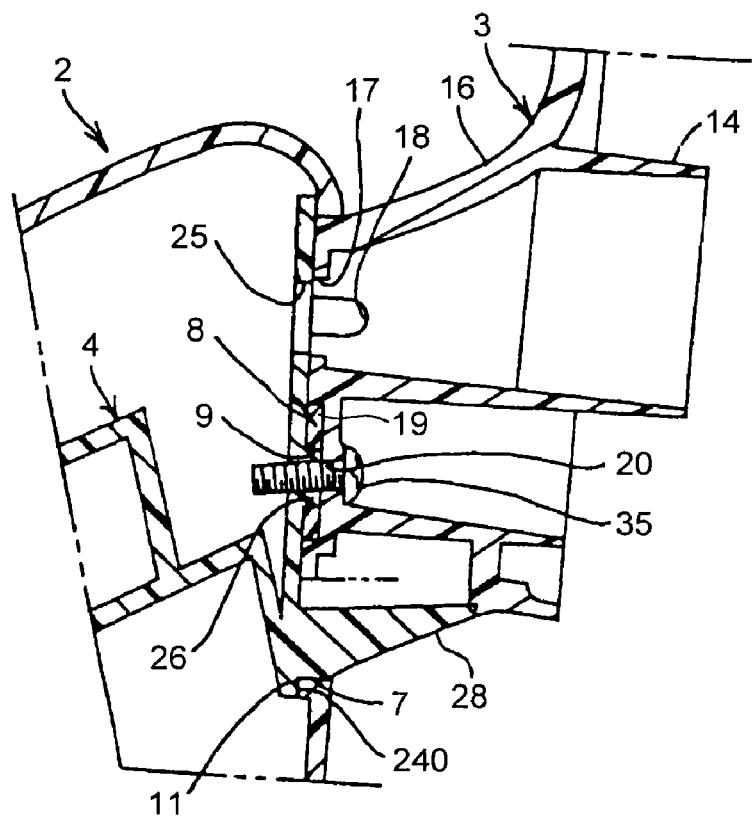
FIG. 14 is a cross section of the mirror apparatus taken along line XIV—XIV in FIG. 9.
Figure 15:
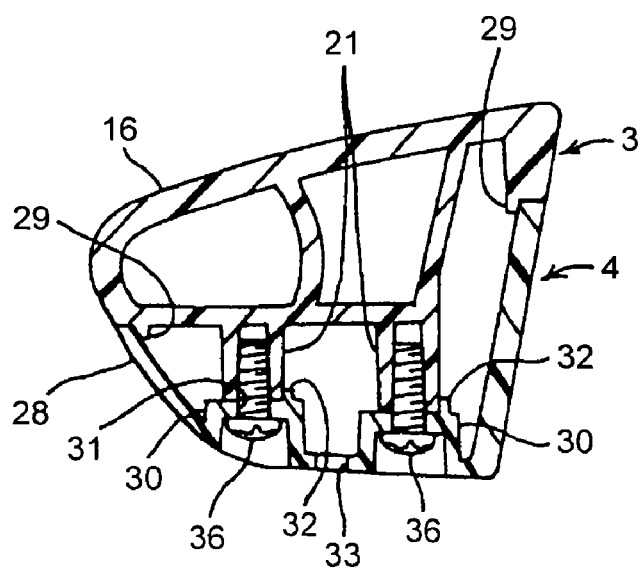
FIG. 15 is a cross section of the mirror apparatus taken along line XV—XV in FIG. 9.

Moreover, the second mounting portion of the base 3 and the second mounting portion of the unit bracket 4 are mounted together with mounting units of two directions as shown in FIGS. 12, 14, and 15. As a result, the base 3 and the unit bracket 4 can be mounted securely so that the mirror unit 38, which is mounted to the base 3 and the unit bracket 4, does not vibrate. Further, it is possible to form considerably narrow neck portions 16 and 28 so that the second mounting portions of the base 3 and of the unit bracket 4 can be miniaturized. Furthermore, an appearance of the mirror apparatus 1 improves because the screws 35 and 36 are not seen from an upper side or a slanting upper side, as directions of the screws 35 and 36 are sideward and upward.

Moreover, the entire circumference of the opening 7 of the mirror housing and the second mounting portion of the unit bracket 4 are provided with the mating flat surface 11 and the mating flat surface 240, which face contact each other. Thus, it is possible to prevent a wind noise (a noise that occurs when the wind is inhaled) between the mirror housing 2 and the unit bracket 4, because the mating flat surface 11 of the mirror housing 2 and the mating flat surface 240 of the unit bracket 4 face contact each other.

As shown in FIG. 13, the mirror apparatus 1 includes the second mounting portion of the base 3 and the second mounting portion of the unit bracket 4. The second mounting portions include the through-holes 17 and 25 to pass through the harness, and the notch 18 as well as the drain 33. The notch 18 and the drain 33 constitute the drain units to evacuate water that enters the car body from the mirror housing 2 through the through-holes 17 and 25. Therefore, water (see the solid-lines arrows in FIG. 13) does not enter into the car body from the mirror housing 2 through the through-holes 17 and 25 by the notch 18 and the drain 33.

Moreover, as shown in FIGS. 16 and 17, the mirror apparatus 1 includes the mirror housing 2 of which outer surface and a part of inner surface (an area ranging from arrows indicated P to the opening 6) are painted a different color from colors of the base 3 or the unit bracket 4. Thus, as the mirror housing is painted, there is no special problems of an appearance, even if an inside of the mirror housing 2 is seen from gaps between edges of the opening 6 and the mirror unit 38, when the mirror unit 38 is tilted to upper and lower directions or to left and right directions through the power unit 41.

It has been explained above that the mounting axes A1—A1 and A2—A2 are positioned close to each other, however, the mounting axes A1—A1 and A2—A2 may be made to coincide.

It has been explained above that the backlash prevention units are provided between the mirror housing 2 and the second mounting portion of the base 3, between the mirror housing 2 and the second mounting portion of the unit bracket 4, and between the second mounting portion of the base 3 and the second mounting portion of the unit bracket 4. However, the backlash prevention unit may be provided in one of the following three positions: between the mirror housing 2 and the second mounting portion of the base 3, between the mirror housing 2 and the second mounting portion of the unit bracket 4, and between the second mounting portion of the base 3 and the second mounting portion of the unit bracket 4.

Furthermore, the entire circumference of the opening 7 of the mirror housing 2 and the second mounting portion of the bracket 4 are provided with the mating flat surface 11 and the mating flat surface 240, which face contact each other. However, the mating flat surfaces may be provided on an entire circumferences of the opening 7 of the mirror housing 2 and on the second mounting portion of the base 3, where the mating flat surfaces face contact each other. The mating flat surfaces may be provided on entire circumferences of the opening 7 of the mirror housing 2, and on the second mounting portion of the base 3, and on the second mounting portion of the unit bracket 4, where the mating flat surfaces face contact one another.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A mirror apparatus for a vehicle comprising:
   a mirror housing;
   a base;
   a unit bracket; and
   a mirror unit, wherein
   the mirror housing, the base, and the unit bracket are formed as separate components and are fixed to a body of the vehicle,
   the mirror housing has a first opening where the mirror unit is mounted, and a second opening,
   the base has a base portion, a first mounting portion, and a second mounting portion, wherein the first mounting portion is provided in one side of the base portion and mounted to the body of the vehicle, and the second mounting portion is provided in another side of the base portion, and to which the unit bracket is mounted, the unit bracket has a first mounting portion and a second mounting portion, wherein the first mounting portion of the unit bracket is mounted to the mirror housing, and to which the mirror unit is mounted, and the second mounting portion of the unit bracket protrudes from the second opening and mounted to the second mounting portion of the base, and the second mounting portion of the base and the second mounting portion of the unit bracket are formed in the form of a narrow neck portion between the mirror housing and the base, wherein a plate portion is integrated into a periphery of the second opening, and the plate portion is sandwiched by the second mounting portion of the base and the second mounting portion of the unit bracket, and the plate portion is fastened together with the second mounting portion of the base and the second mounting portion of the unit bracket.

2. A mirror apparatus for a vehicle comprising:
a mirror housing;
a base;
a unit bracket;
a mirror unit, wherein
  the mirror housing, the base, and the unit bracket are formed as separate components,
  the mirror housing has a first opening where the mirror unit is mounted, and a second opening,
  the base has a base portion, a first mounting portion, and a second mounting portion, wherein the first mounting portion is provided in one side of the base portion and configured to be mounted to the vehicle, and the second mounting portion is provided in another side of the base portion, and to which the unit bracket is mounted,
  the unit bracket has a first mounting portion and a second mounting portion, wherein the first mounting portion of the unit bracket is mounted to the mirror housing, and to which the mirror unit is mounted, and the second mounting portion of the unit bracket protrudes from the second opening and is mounted to the second mounting portion of the base, and
  the second mounting portion of the base and the second mounting portion of the unit bracket are formed in the form of a narrow neck portion between the mirror housing and the base, wherein the mirror housing is free of a neck portion that protrudes out from general shape of the mirror housing; and
a housing-base fixing unit, comprising at least a portion of the base, arranged to fix the mirror housing to the base.

3. The mirror apparatus according to claim 2, wherein a mounting axis of the first mounting portion of the base and a mounting axis of the second mounting portion of the base are substantially parallel to each other and are adjacent to each other.

4. The mirror apparatus according to claim 2, wherein the second mounting portion of the unit bracket is mounted to the second mounting portion of the base such that the unit bracket suspends from the base.

5. The mirror apparatus according to claim 2, further comprising a backlash prevention unit provided in any one of between the mirror housing and the second mounting portion of the base, between the mirror housing and the second mounting portion of the unit bracket, and between the second mounting portion of the base and the second mounting portion of the unit bracket.

6. The mirror apparatus according to claim 2, further comprising a positioning unit that fixes the second mounting portion of the base to the second mounting portion of the unit bracket.

7. The mirror apparatus according to claim 6, wherein the positioning unit includes:
  a first fixing unit that fixes the second mounting portion of the base to the second mounting portion of the unit bracket to prevent relative movement of the base and the unit bracket in a first direction; and
  a second fixing unit that fixes the second mounting portion of the base and the second mounting portion of the unit bracket to prevent relative movement of the base and the unit bracket in a second direction perpendicular to the first direction.

8. The mirror apparatus according to claim 2, further comprising flat surfaces on an entire circumference of the second opening, and any one of the second mounting portion of the base and the second mounting portion of the bracket, wherein the flat surfaces touch each other along the entire circumference.

9. The mirror apparatus according to claim 2, wherein an inner surface of the mirror housing includes a first surface that is adjacent to the first opening and a second surface other than the first surface, the mirror apparatus further comprising:
  a coating of a first color on the first surface and an outer surface of the mirror housing; and
  a coating of a second color, different from the first color, on the second surface, an outer surface of the base, and an outer surface of the unit bracket.

10. A mirror apparatus for a vehicle comprising:
a mirror housing;
a base;
a unit bracket;
a mirror unit, wherein
  the mirror housing, the base, and the unit bracket are formed as separate components,
  the mirror housing has a first opening where the mirror unit is mounted, and a second opening,
  the base has a base portion, a first mounting portion, and a second mounting portion, wherein the first mounting portion is provided in one side of the base portion and configured to be mounted to the vehicle, and the second mounting portion is provided in another side of the base portion, and to which the unit bracket is mounted,
  the unit bracket has a first mounting portion and a second mounting portion, wherein the first mounting portion of the unit bracket is mounted to the mirror housing, and to which the mirror unit is mounted, and the second mounting portion of the unit bracket protrudes from the second opening and is mounted to the second mounting portion of the base, and
  the second mounting portion of the base and the second mounting portion of the unit bracket are formed in the form of a narrow neck portion between the mirror housing and the base, wherein the second opening is in a side surface of the mirror housing that is substantially planar; and
a housing-base fixing unit, comprising at least a portion of the base, arranged to fix the mirror housing to the base.

11. The mirror apparatus according to claim 10, wherein a mounting axis of the first mounting portion of the base and a mounting axis of the second mounting portion of the base are substantially parallel to each other and are adjacent to each other.

12. The mirror apparatus according to claim 10, wherein the second mounting portion of the unit bracket is mounted to the second mounting portion of the base such that the unit bracket suspends from the base.

13. The mirror apparatus according to claim 10, further comprising a backlash prevention unit provided in any one of between the mirror housing and the second mounting portion of the base, between the mirror housing and the second mounting portion of the unit bracket, and between the second mounting portion of the base and the second mounting portion of the unit bracket.

14. The mirror apparatus according to claim 10, further comprising a positioning unit that fixes the second mounting portion of the base to the second mounting portion of the unit bracket.

15. The mirror apparatus according to claim 14, wherein the positioning unit includes:
a first fixing unit that fixes the second mounting portion of the base to the second mounting portion of the unit bracket to prevent relative movement of the base and the unit bracket in a first direction; and a second fixing unit that fixes the second mounting portion of the base and the second mounting portion of the unit bracket to prevent relative movement of the base and the unit bracket in a second direction perpendicular to the first direction.

16. The mirror apparatus according to claim 10, further comprising flat surfaces on an entire circumference of the second opening, and any one of the second mounting portion of the base and the second mounting portion of the bracket, wherein the flat surfaces touch each other along the entire circumference.

17. The mirror apparatus according to claim 10, wherein an inner surface of the mirror housing includes a first surface that is adjacent to the first opening and a second surface other than the first surface, the mirror apparatus further comprising:
a coating of a first color on the first surface and an outer surface of the mirror housing; and
a coating of a second color, different from the first color, on the second surface, an outer surface of the base, and an outer surface of the unit bracket.

* * * * *